United States Patent
Sinha et al.

(10) Patent No.: US 11,718,032 B2
(45) Date of Patent: Aug. 8, 2023

(54) PLASMA-TREATED POWDERS FOR ADDITIVE MANUFACTURING

(71) Applicant: The Boeing Company, Chicago, IL (US)

(72) Inventors: Nishant Kumar Sinha, Bangalore (IN); Om Prakash, Bangalore (IN)

(73) Assignee: The Boeing Company, Chicago, IL (US)

( * ) Notice: Subject to any disclaimer, the term of this patent is extended or adjusted under 35 U.S.C. 154(b) by 802 days.

(21) Appl. No.: 16/527,385

(22) Filed: Jul. 31, 2019

(65) Prior Publication Data

US 2021/0031452 A1    Feb. 4, 2021

(51) Int. Cl.
| | | |
|---|---|---|
| *B29C 64/314* | (2017.01) | |
| *B33Y 10/00* | (2015.01) | |
| *B33Y 40/00* | (2020.01) | |
| *B29C 64/153* | (2017.01) | |
| *B33Y 30/00* | (2015.01) | |
| *B33Y 50/02* | (2015.01) | |
| *B33Y 70/00* | (2020.01) | |

(Continued)

(52) U.S. Cl.
CPC .......... *B29C 64/314* (2017.08); *B29C 64/153* (2017.08); *B29C 64/20* (2017.08); *B29C 64/393* (2017.08); *B33Y 10/00* (2014.12); *B33Y 30/00* (2014.12); *B33Y 40/00* (2014.12); *B33Y 50/02* (2014.12); *B33Y 70/00* (2014.12); *B33Y 80/00* (2014.12); *C09D 11/101* (2013.01); *C09D 11/102* (2013.01)

(58) Field of Classification Search
CPC ..... B29C 64/314; B29C 64/153; B29C 64/20; B29C 64/393; B33Y 70/00; B33Y 10/00; B33Y 40/00; B33Y 50/02
See application file for complete search history.

(56) References Cited

U.S. PATENT DOCUMENTS

| | | | |
|---|---|---|---|
| 5,755,913 | A | 5/1998 | Liaw et al. |
| 6,007,764 | A | 12/1999 | Benda et al. |

(Continued)

FOREIGN PATENT DOCUMENTS

| | | |
|---|---|---|
| EP | 2108502 A2 | 10/2009 |
| EP | 3098060 A1 | 11/2016 |

OTHER PUBLICATIONS

Non-Final Office Action regarding U.S. Appl. No. 16/527,433, dated Mar. 25, 2022, 8 pages.

(Continued)

*Primary Examiner* — Michael P Wieczorek
(74) *Attorney, Agent, or Firm* — Yee & Associates, P.C.

(57) ABSTRACT

Illustrative examples of forming material suitable for use in additive manufacturing processes includes operations of: exposing a first polymer powder to a first plasma, such that an amine-functionalized powder is formed; exposing a second polymer powder to a second plasma, such that an epoxide-functionalized powder is formed; and combining the amine-functionalized powder and the epoxide-functionalized powder to form a precursor material. The precursor material is subsequently heated in an additive manufacturing process to form a structure, where heating of the precursor material causes covalent chemical bonds to form between the first polymer powder and the second polymer powder.

20 Claims, 6 Drawing Sheets

(51) Int. Cl.
   *B33Y 80/00*    (2015.01)
   *B29C 64/20*    (2017.01)
   *B29C 64/393*   (2017.01)
   *C09D 11/101*   (2014.01)
   *C09D 11/102*   (2014.01)

(56)           References Cited

U.S. PATENT DOCUMENTS 8,862,258 B2 *  10/2014  Nimal ................... B22F 5/10
                                                   700/98
   8,927,616 B2 *   1/2015  Thomas ................ C08J 3/28
                                                   623/20.14
   9,193,849 B2 *  11/2015  Stelzig ................ C09C 3/00
   2002/0014306 A1   2/2002  Virtanen
   2007/0281126 A1  12/2007  Lahann et al.
   2009/0181592 A1   7/2009  Dugan
   2014/0023817 A1   1/2014  Kaushik et al.
   2014/0287945 A1*  9/2014  Lau .................... C12Q 1/6837
                                                   506/18
   2016/0271874 A1   9/2016  Tsai et al.
   2019/0029337 A1   1/2019  DeGanello et al.

OTHER PUBLICATIONS

Extended European Search Report, dated Dec. 11, 2020, regarding Application No. 20187844.4, 9 pages.
Extended European Search Report, dated Jan. 11, 2021, regarding Application No. 20187846.4, 7 pages.

* cited by examiner

PLASMA-TREATED POWDERS FOR ADDITIVE MANUFACTURING

CROSS-REFERENCE TO RELATED APPLICATION

This application is related to the following U.S. patent application Ser. No. 16/527,433, filed Jul. 31, 2019, now U.S. Pat. No. 11,654,622, issued May 23, 2023, entitled "Plasma-Treated Sheets for Additive Manufacturing," and filed even date here, which is incorporated herein by reference in its entirety.

BACKGROUND INFORMATION

Field

The present disclosure generally relates to additive manufacturing, and more particularly, to compositions, preparations, and uses of plasma-treated powders in additive manufacturing.

Background

Additive manufacturing is a manufacturing process in which an additive manufacturing system fabricates an object based on a three-dimensional model or other digital representation of a three-dimensional object. An example of an additive manufacturing system is a three-dimensional printer. Additive manufacturing systems fabricate objects by sequentially depositing layers of constituent material in the shape of the object until it is formed. In one example, successive layers of material, representing cross-sections of the object, are deposited. These deposited layers of material are fused and solidified to build up the final object. The final three-dimensional object is fully dense and can include complex shapes—"fully dense" generally indicating that an object is substantially free of unintended void regions.

A typical additive manufacturing process includes depositing a base material onto a build surface, and directing an energy source onto the build surface to form a melt pool on the build surface. The build surface is initially a substrate. For later depositions, the build surface is a previously deposited layer of base material. The base material is deposited into and incorporated by the melt pool to provide additional material to the object layer-by-layer.

One type of additive manufacturing process forms successive layers of a fabricated object using sequential melt pool depositions. In such a process, each successive layer of the fabricated object is generally attached to the immediately preceding layer by melting material in regions of contact between adjacent material layers. For example, an $n^{th}$ layer melted on and into an $(n-1)^{th}$ layer, where 'n' is the currently-deposit layer in the fabrication sequence, and 'n−1' is the immediately-preceding layer in the fabrication sequence. The melting of material in contact with and between adjacent layers, however, may not provide as strong of an attachment between sequentially formed layers as desired in terms of one or more specifications for an additively manufactured part.

Therefore, it would be desirable to have a composition, method, apparatus, and system that take into account at least some of the issues discussed above, as well as other possible issues. For example, it would be desirable to have a composition, method, apparatus, and system that overcome technical problems associated with providing strong or otherwise improved attachment between sequentially formed layers of an object using an additive manufacturing process.

SUMMARY

One illustrative example of the present disclosure provides a method for additive manufacturing. The method comprises exposing a first particulate material to a first plasma, such that an amine-functionalized particulate is formed. The amine-functionalized particulate includes amine chemical moieties. A second particulate material is exposed to a second plasma, such that an epoxide-functionalized particulate is formed. The epoxide-functionalized particulate includes epoxide chemical moieties. The amine-functionalized particulate and the epoxide-functionalized particulate are combined. The combination is heated to form a heated combination. The heated combination is cooled to form a structure.

Another illustrative example of the present disclosure provides a method for additive manufacturing. The method comprises adding an amine-functionalized polymer with an epoxide-functionalized polymer to form a first combination. The amine-functionalized polymer is provided as a first polymer particulate treated with a first plasma, and the epoxide-functionalized polymer is provided as a second polymer particulate treated with a second plasma. The first combination is thermocycled to form a thermocycled combination. Covalent bonds are formed by dehydration reactions occurring between amine chemical moieties of the amine-functionalized polymer and epoxide chemical moieties of the epoxide-functionalized polymer. Successive combinations of the amine-functionalized polymer and the epoxide-functionalized polymer are formed over the thermocycled combination. Each of the successive combinations is thermocycled to form successive covalent bonds with an immediately preceding combination.

Another illustrative example of the present disclosure provides a method for forming precursor material that can be used in an additive manufacturing process. The method comprises exposing a first powder to a first plasma such that an amine-functionalized powder is formed. The method also comprises exposing a second powder to a second plasma such that an epoxide-functionalized powder is formed. The method also comprises combining the amine-functionalized powder and the epoxide-functionalized powder to form a precursor material for additive manufacturing.

Another illustrative example of the present disclosure provides an additive manufacturing system that includes a laser system. The additive manufacturing system also includes a powder supply system that supplies a combined powder. The combined powder comprises a first chemically-functionalized polymer powder and a second chemically-functionalized polymer powder different than the first chemically-functionalized polymer powder. The combined powder is configured or otherwise suitably adapted for covalent bonds to be formed between the first chemically-functionalized polymer powder and the second chemically-functionalized polymer powder upon exposure to heat. The additive manufacturing system also includes a build platform and a controller. The controller is in communication with the laser system and the powder supply system. The controller operates and is configured to control the powder supply system to deposit the combined powder onto the build platform. The controller operates and is configured to control the laser system to apply heat to the combined powder on the build platform.

Another illustrative example of the present disclosure provides a precursor material for additive manufacturing. The precursor material includes a first chemically-functionalized polymer particulate, and a second chemically-functionalized polymer particulate different than the first chemically-functionalized polymer particulate. The precursor material is configured or otherwise suitably adapted for covalent bonds to be formed between the first chemically-functionalized polymer particulate and the second chemically-functionalized polymer particulate upon exposure to heat.

Yet another illustrative example of the present disclosure provides a three-dimensional part formed with an additive manufacturing process. The three-dimensional part includes a first portion of a polymer material, and a second portion of the polymer material. The second portion is covalently bonded through a plurality of nitrogen atoms to the first portion.

Features and functions can be achieved independently in various examples of the present disclosure, or may be combined in yet other examples, in which further details can be seen with reference to the following description and drawings.

BRIEF DESCRIPTION OF THE DRAWINGS

Representative features of illustrative examples are set forth in the appended claims. Illustrative examples, however, as well as representatively described modes of use, further objectives, and features thereof, will best be understood by reference to the following detailed description of illustrative examples of the present disclosure when read in conjunction with accompanying drawings, wherein:

DETAILED DESCRIPTION

Figure 1:
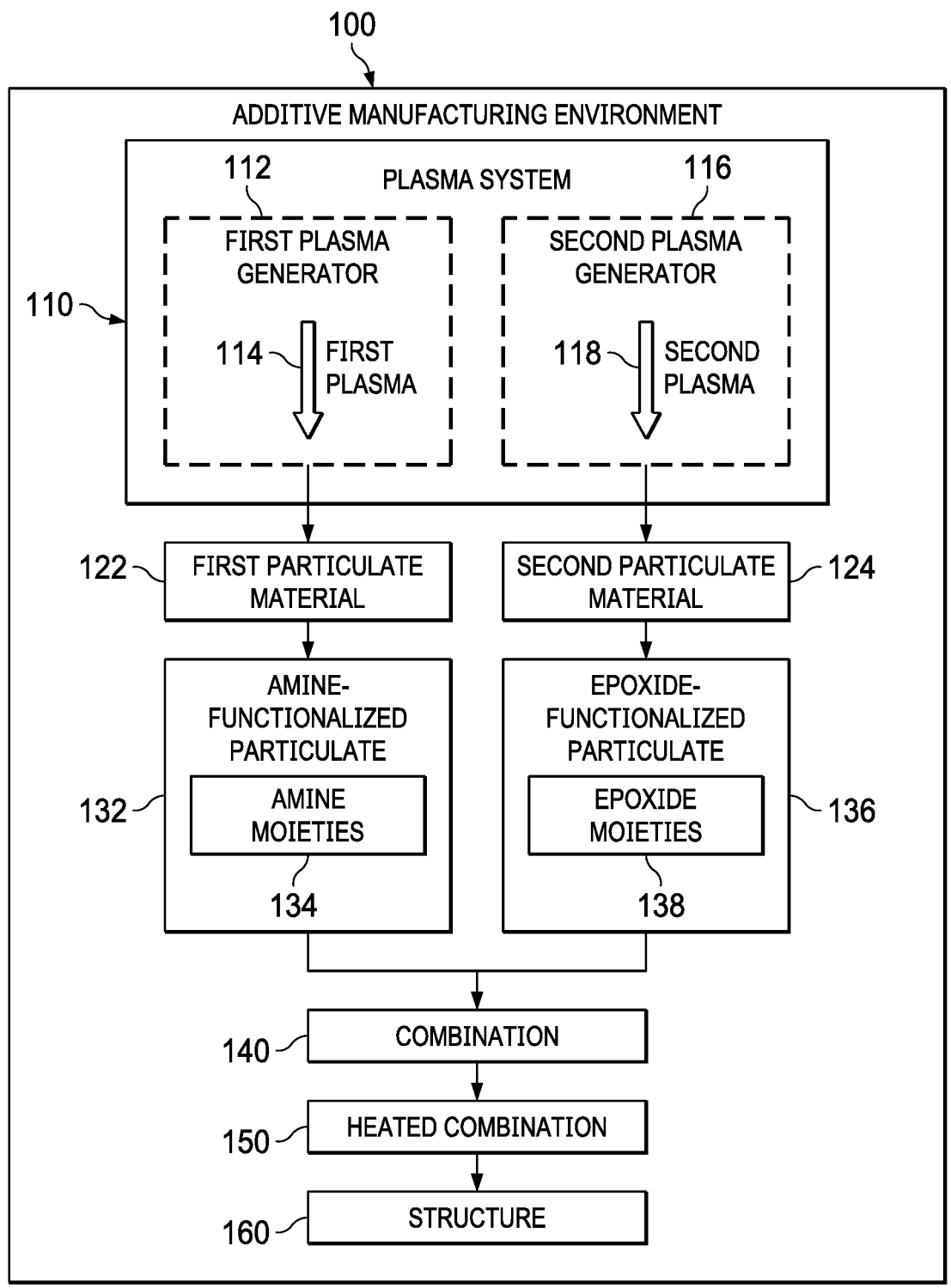
FIG. 1 is an illustration of a block diagram of an additive manufacturing environment in accordance with an illustrative example.

Illustrative examples herein recognize and take into account one or more different considerations. For example, illustrative examples recognize and take account that parts manufactured with selective laser sintering processes generally exhibit intra-layer and inter-layer part strength that is lower than that of parts manufactured with, for example, injection molding. More particularly, illustrative examples also recognize and take into account that parts manufactured with selective laser sintering typically have limited chain diffusion between constituent material layers after solidification.

Illustrative examples herein describe methods of forming strong three-dimensional parts with molecular/chemical cross-linking among constituent materials in a same layer or between different layers. In illustrative examples described herein, polymer powders are plasma treated to include, for example, amine ($-NH_2$) functionality or epoxide functionality. The plasma-treated polymer powders are mixed or otherwise combined in a pre-determined ratio. The combination of plasma-treated powders can include a same polymer powder. The combined plasma-treated powders are then sintered. Cross-linking reactions that form covalent bonds between and among the plasma-treated powder particles provide strong chemical bonds and overall stronger three-dimensional parts as compared to, for example, other additive manufacturing techniques.

In some illustrative examples, thermoplastic sheets can be plasma treated to include, for example, amine functionality and epoxide functionality on either side. The plasma-treated sheets can then be sequentially stacked, such that they are selectively joined at predetermined locations or regions at successive interfaces between build layers using a heat source, such as a laser that can be selectively focused and moved. Cross-linking reactions that form successive covalent bonds between the plasma-treated sheets, in addition to interlayer chain diffusion, provides strong chemical bonds and overall stronger three-dimensional parts as compared to, for example, other additive manufacturing techniques.

In some implementations, a first portion of a polymer powder is treated with an ammonia ($NH_3$) plasma or nitrogen plasma—or a nitrogen and hydrogen plasma—to selectively introduce amine chemical functionality on particle surfaces of the first portion of the polymer powder. A second portion of the powder is treated with an oxygen or carbon dioxide ($CO_2$) plasma to introduce epoxide chemical functionality on particle surfaces of the second portion of the polymer powder. The first plasma-treated powder is mixed with the second plasma-treated powder, and thereafter subjected to a heat source, such as a laser of a selective laser sintering system, to initiate chemical cross-linking. In an illustrative example, the first plasma-treated powder can be uniformly mixed with the second plasma-treated powder prior to heating.

Chemical cross-linking involves chemical dehydration reactions occurring between amine chemical moieties of the plasma-treated first portion of the polymer powder and epoxide chemical moieties of the plasma-treated second portion of the polymer powder. The first portion of the polymer powder can comprise a same polymer powder as the second portion of the polymer powder. Covalent bonds are formed by dehydration reactions—for example, chemical bonds through nitrogen atoms formerly associated with the amine chemical moieties prior to sintering. The covalent bonds are between particles of the first plasma-treated powder and particles of the second plasma-treated powder. Water is produces as a byproduct of the chemical reaction. The covalent bonds formed by chemical cross-linking between particles of the first plasma-treated powder and particles of the second plasma-treated powder generally provide stronger adherence between cross-linked particles that leads to improved part strength. Cross-linking between particles takes place at interfaces between the particles, and operates to join the particles together with covalent chemical bonds, as well as thermally induced chain diffusion of polymer material forming the particles. Covalent bonds formed with chemically functionalized particles, in accordance with illustrative examples described herein, contribute to improved strength of additively manufacture parts. By way of comparison to existing technologies employing only polymer chain diffusion in powder-based additive manufacturing processes, particles that are not chemically functionalized to form covalent bonds with each other will not exhibit desired part strength. Chemical cross-linking with formation of attendant covalent bonds, on the other hand, provides improved part strength as compared to techniques employing polymer chain diffusion alone.

In other illustrative examples, a first thermoplastic sheet is treated with an ammonia or nitrogen plasma—or a nitrogen ($N_2$) and hydrogen ($H_2$) plasma—to selectively introduce amine chemical functionality on a surface of the first thermoplastic sheet. A second thermoplastic sheet is treated with an oxygen ($O_2$) or carbon dioxide plasma to introduce epoxide chemical functionality on a surface of the second thermoplastic sheet. The first plasma-treated surface is located to and contacts the second plasma-treated surface. Location of the first plasma-treated surface can be, for example, above, over, or on the second plasma-treated surface. The formation of a first feature "over" or "on" a second feature may include examples in which the first and second features are formed in direct contact, and may also include examples in which additional features may be formed between the first and second features, such that the first and second features may not be in direct contact. Spatially relative terms, such as "up," "down," "under," "beneath," "below," "lower," "upper," "above," "over," "higher," "adjacent," "interadjacent," "interposed," "between," or the like, may be used herein for ease of description to representatively describe one or more elements or features in relation to other elements or features as representatively illustrated in the Figures. Spatially relative terms are intended to encompass different orientations of devices or objects in use or operation, in addition to orientations illustrated in the Figures. An apparatus, device, or object may be otherwise spatially transformed—for example, rotated by 90 degrees—and the spatially relative descriptors used herein may likewise be interpreted accordingly.

The sheet assembly is subjected to a heat source, such as a laser, to initiate sintering and chemical cross-linking. In some illustrative examples, a sub-surface deposition of heat at a focused depth along a predetermined path can be accomplished using any available methods, systems, or devices. For example, a number of polymer sheets may be stack over each other, and a sub-surface deposition of heat within the stack of sheets may be performed to initiate sintering and chemical cross-linking at a predetermined depth within the stack.

Chemical cross-linking between sheets involves dehydration reactions occurring between amine chemical moieties of the first thermoplastic sheet and epoxide chemical moieties of the second thermoplastic sheet. The dehydration reactions form covalent bonds—for example, through nitrogen atoms formerly associated with the amine chemical moieties prior to chemical cross-linking. The covalent bonds are between respective plasma-treated first and second thermoplastic sheets. Water ($H_2O$) is produced as a byproduct of the dehydration reaction. Covalent bonds formed by chemical cross-linking between the plasma-treated thermoplastic sheets generally provides stronger adherence between cross-linked sheet surfaces that leads to improved overall part strength.

In illustrative examples, one or more technical solutions are presented that overcome technical problems associated with providing strong intra-layer or inter-layer adhesion in additively manufactured parts. As a result, one or more technical solutions described herein provide technical effects of enabling formation of chemical bonds between constituent materials used in additive manufacturing processes, enabling fabrication of additively manufactured parts that are at least as strong as parts fabricated with injection molding techniques, enabling increased utilization of additive manufacturing for making strong parts, supporting part qualification with respect to manufacturing specifications or mechanical property requirements, or realizing cost savings associated with using additive manufacturing to make parts that are at least as strong as parts fabricated with other processes.

The flowcharts and block diagrams in the different depicted examples illustrate architecture, functionality, and operation of some possible implementations of apparatuses and methods in illustrative examples. In this regard, each block in flowcharts or block diagrams can represent at least one of a module, a segment, a function, or a portion of an operation or step. The Figure illustrations are not meant to imply physical or architectural limitations to the manner in which illustrative examples may be implemented. Other components in addition to or in place of ones illustrated may be used. Some components may be unnecessary. Additionally, blocks are presented to illustrate some functional components. One or more blocks may be combined, divided, or combined and divided into different blocks when implemented in an illustrative example.

With reference now to the figures, and in particular with reference to FIG. 1, an illustration of a block diagram of an additive manufacturing environment is depicted in accordance with an illustrative example. As depicted, additive manufacturing environment 100 includes plasma system 110. In this illustrative example, plasma system 110 is a physical system and can include any type or any number of component devices. In this illustrative example, plasma system 110 can include at least one of a wand plasma device, an atmospheric plasma device, a plasma chamber, other suitable type of component device, or combinations thereof.

As used herein, the phrase "at least one of," when used with a list of items, means different combinations of one or more of the listed items can be used, and only one of each item in the list may be needed. In other words, "at least one of" means any combination of items or number of items can be used from the list, but not all of the items in the list are required. The item can be a particular object, a thing, or a category. For example, without limitation, "at least one of item A, item B, or item C" may include item A, item A and item B, or item B. This example also may include item A and item B and item C, or item B and item C. Of course, any permutative combination of these items can be present. In some illustrative examples, "at least one of" can be, for example, without limitation: two of item A, one of item B, and ten of item C; four of item B and seven of item C; or other suitable combinations.

As used herein, the terms "comprises," "comprising," "includes," "including," "has," "having," or any contextual variant thereof, are intended to cover a non-exclusive inclusion. For example, a process, product, composition, article, or apparatus that comprises a list of elements is not necessarily limited to only those elements, but may include other elements not expressly listed or inherent to such process, product, composition, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless the context clearly indicates otherwise. Also, as used in the description herein, the meaning of "in" includes "in" and "on," unless the context clearly indicates otherwise.

Plasma system 110 includes first plasma generator 112 and second plasma generator 116. First plasma generator 112 is configured to generate first plasma 114. Second plasma generator 116 is configured to generate second plasma 118. In some illustrative examples, first plasma generator 112 can be a same plasma generator as second plasma generator 116 used at different times to produce first plasma 114 and second plasma 118.

First particulate material 122 is exposed to first plasma 114 to produce amine-functionalized particulate 132, such that amine-functionalized particulate includes amine chemical functional groups on surfaces of first particulate material 122. For example, first plasma generator 112 can be suitably configured to produce an ammonia-containing plasma as first plasma 114. In illustrative examples, first plasma 114 can include ammonia ($NH_3$), or first plasma 114 can conjunctively or alternatively include molecular nitrogen ($N_2$), molecular hydrogen ($H_2$), or molecular nitrogen and molecular hydrogen.

As used herein, the term "particulate material" generally refers to matter in particulate form. As used herein, the term "particulate," or contextual variants thereof, generally means being relating to or being in the form of separate particles. As used herein, the term "particle," or contextual variants thereof, generally refers to a portion or fragment of matter. In some illustrative examples, particles can range in size from 5μ to 300μ, and can have any type of shape—for example, at least one of spherical, oblate, prolate, spheroid, cylindrical, orthorhombic, regular, irregular, or the like. Additionally, a quantity of particles comprising a same material can be provided in any number of sizes, or any number of shapes.

First particulate material 122 includes a polymer material suitably configured for use in a powder-based additive manufacturing process. For example, first particulate material 122 can include, nylon, flame-retardant nylon, mineral/glass-filled nylon, polystyrene, polyethylene, polymethylmethacrylate (PMMA), thermoplastic elastomers, polyarylether ketones (PAEK), other polymer material, or the like. In representative implementations, selection of a suitable polymer material can be based on, for example, a desired flowability, viscosity, melting temperature, characteristic of a three-dimensional part so formed, or characteristic relating to stability under conditions for achieving an activation energy associated with forming covalent chemical bonds between particles.

Exposure of first particulate material 122 to first plasma 114 produces amine-functionalized particulate 132. Amine-functionalized particulate 132 includes amine chemical moieties 134 on exposed surfaces of amine-functionalized particulate 132. As depicted, amine chemical moieties 134 can be a number of —$NH_2$ chemical functional groups.

Second particulate material 124 is exposed to second plasma 118 to produce epoxide-functionalized particulate 136, such that epoxide-functionalized particulate includes epoxide chemical functional groups on surfaces of first particulate material 122. For example, second plasma generator 116 can be suitably configured to produce an oxygen-containing plasma as second plasma 118. In illustrative examples, second plasma 118 can include oxygen, or second plasma 118 can conjunctively or alternatively include molecular oxygen ($O_2$) or carbon dioxide ($CO_2$).

Second particulate material 124 includes a polymer material suitably configured for use in an additive manufacturing process. Second particulate material 124 can include a same polymer material as first particulate material 122. For example, second particulate material 124 can include, nylon, flame-retardant nylon, mineral/glass-filled nylon, polystyrene, polyethylene, Polymethylmethacrylate (PMMA), thermoplastic elastomers, polyarylether ketones (PAEK), other polymer material, or the like. In representative implementations, selection of a suitable polymer material can be based on, for example, a desired flowability, viscosity, melting temperature, characteristic of a three-dimensional part so formed, or characteristic relating to stability under conditions for achieving an activation energy associated with forming covalent chemical bonds between particles.

Exposure of second particulate material 124 to second plasma 118 produces epoxide-functionalized particulate 136. Epoxide-functionalized particulate 136 includes epoxide chemical moieties 138 on exposed surfaces of epoxide-functionalized particulate 136. In illustrative examples, epoxide chemical moieties 138 includes bridging —O— chemical functional groups.

Amine-functionalized particulate 132 and epoxide-functionalized particulate 136 are combined to form combination 140. That is to say, combination 140 includes a mixture of amine-functionalized particles and epoxide-functionalized particles. In representative aspects, combination 140 can be a 1:1 mixture of amine-functionalized particulate 132 and epoxide-functionalized particulate 136. As discussed later herein, other ratios of amine-to-epoxide particles are also possible, such that a desired amount or density of cross-linking is achieved.

In an illustrative example, combination 140 can be uniformly mixed in a pre-determined ratio of amine-functionalized particulate 132 and epoxide-functionalized particulate 136. In another illustrative example, amine-functionalized particulate 132 can be a plurality of amine-functionalized particles, and epoxide-functionalized particulate 136 can be a plurality of epoxide-functionalized particles. In yet another illustrative example, amine-functionalized particulate 132 can be a plurality of amine-functionalized polymer particles, and epoxide-functionalized particulate 136 can be a plurality of epoxide-functionalized polymer particles.

Combination 140 is subjected to heat in order to form heated combination 150. In illustrative examples, one or more heat sources can include a laser—for example, as used in a selective laser sintering additive manufacturing system. It will be appreciated, however, that other types of heat sources can be alternatively, conjunctively, or sequentially used.

As described in greater detail later herein with reference to FIGS. 5-7, heating of combination 140 initiates chemical reactions between amine chemical moieties 134 and epoxide chemical moieties 138 to produce covalent chemical bonds between amine-functionalized particulate 132 and epoxide-functionalized particulate 136. Formation of covalent chemical bonds provides improved part strength with representative implementations of materials and additive manufacturing processes according to illustrative examples.

Heated combination 150 is thereafter cooled to form structure 160. In an illustrative example, structure 160 may not be a fully-formed part. For example, in some illustrative examples, structure 160 can be a component layer or a subset of component layers of an additively manufactured three-dimensional part. Structure 160 can be, for example, an aircraft part, an interior monument, a wall, an air duct, a fairing, wire shrouds, power distribution panels, stowage cases, gear box cover, a lattice structure, a skin panel, a bracket, a handle, or the like.

Figure 2:
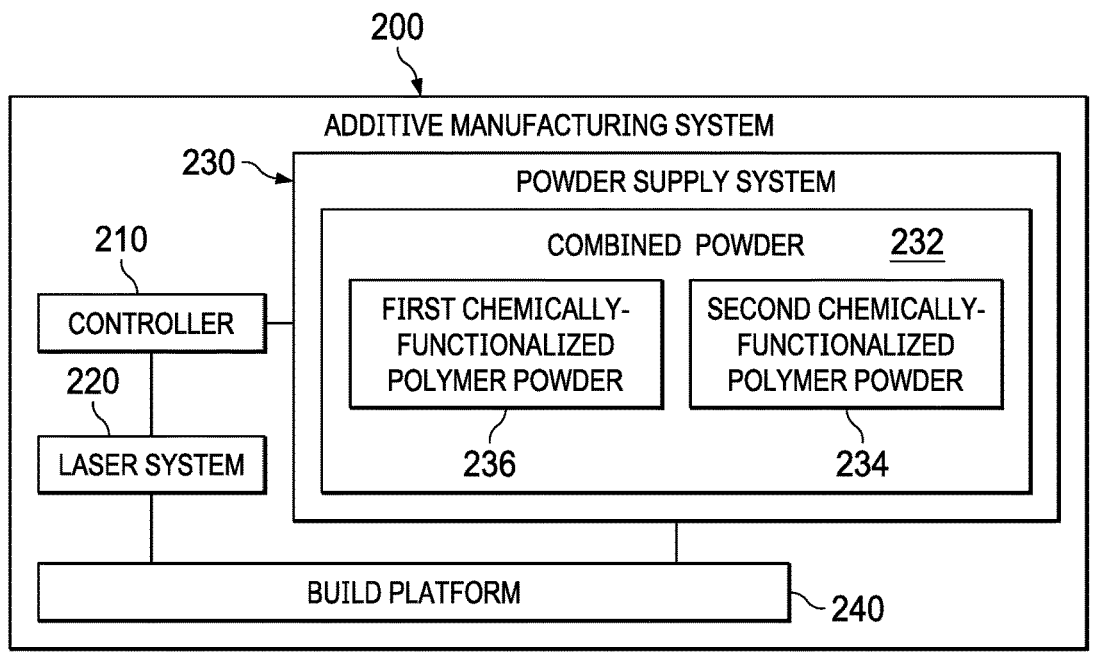
FIG. 2 is an illustration of a block diagram of an additive manufacturing system in accordance with an illustrative example.

Turning now to FIG. 2, an illustration of a block diagram of an additive manufacturing system is depicted in accordance with an illustrative example. In this illustrative example, additive manufacturing system 200 is an example of a manufacturing system that can use combination 140 in the form of a powder to fabricate structure 160 in FIG. 1.

The term "powder" generally refers to material comprising particles that have a shape and size that can flow freely when shaken or tilted. A powder can also have a tendency to clump. As such, a powder can be understood to correspond to a type of particle; however, it will be appreciated that not all particles comprise powders. In some illustrative examples, powders can range in size from 5μ to 300μ, and can have any type of shape—for example, at least one of spherical, oblate, prolate, spheroid, cylindrical, orthorhombic, regular, irregular, or the like. Additionally, a quantity of powder comprising a same material can be provided in any number of particle sizes, or any number of particle shapes.

Additive manufacturing system 200 includes a number of different components. As generally depicted, additive manufacturing system 200 comprises controller 210, laser system 220, powder supply system 230, and build platform 240. Controller 210 is in communication with laser system 220. Controller 210 is also in communication with powder supply system 230.

Build platform 240 provides an initial substrate to begin deposition of material to form an additively manufactured part. Build platform 240 also provides support for building up sequential component layers of the manufactured part during additive deposition of material to form the part. Powder supply system 230 supplies material for deposition on, above, or over build platform 240. As generally depicted in FIG. 2, powder supply system 230 includes combined powder 232.

In this illustrative example, combined powder 232 is an example of an implementation of combination 140 in FIG. 1. As generally depicted, combined powder 232 includes first chemically-functionalized polymer powder 236 and second chemically-functionalized polymer powder 234. First chemically-functionalized polymer powder 236 can be a same polymer powder as second chemically-functionalized polymer powder 234. Combined powder 232 can be uniformly mixed in a pre-determined ratio of first chemically-functionalized polymer powder 236 and second chemically-functionalized polymer powder 234. As discussed later herein, the ratio of amine-to-epoxide particles can be adjusted, such that a desired amount or density of cross-linking is achieved Chemical functionalization of first chemically-functionalized polymer powder 236 and second chemically-functionalized polymer powder 234 is such that a chemical reaction between chemical moieties of first chemically-functionalized polymer powder 236 and second chemically-functionalized polymer powder 234 can be performed to produce covalent bonds between first chemically-functionalized polymer powder 236 and second chemically-functionalized polymer powder 234.

In an illustrative example, first chemically-functionalized polymer powder 236 can include amine chemical moieties produced from treating a first polymer powder with an ammonia-containing plasma, and second chemically-functionalized polymer powder 234 can include epoxide chemical moieties produced from treating a second polymer powder with an oxygen-containing plasma.

Powder supply system 230 supplies combined powder 232 to build platform 240. Laser system 220 is configured to heat combined powder 232 deposited on, over, or above build platform 240. Heating of combined powder 232 initiates chemical reactions between amine chemical moieties of first chemically-functionalized polymer and epoxide moieties of second chemically-functionalized polymer to produce covalent chemical bonds among and between particles of combined powder 232.

Controller 210 is a physical hardware system or device that controls and is in communication with laser system 220 and powder supply system 230. In an illustrative example, controller 210 controls and communicates with powder supply system 230 to supply and sequentially deposit a number of layers of combined powder 232 on, over, or above build platform 240 during additive manufacture of a three-dimensional part. Controller 210 is also configured to control laser system 220 to apply heat to each of the number of layers of combined powder 232 during respective stages of additive manufacture of a three-dimensional part. For example, controller 210 communicates with powder supply system 230 to supply and deposit an initial layer of combined powder 232 on build platform 240. Controller 210 then communicates with laser system 220 to heat the initial layer of combined powder 232 to initiate sintering and chemical cross-linking between and among chemically functionalized particles of combined powder 232 of the initial layer.

The heated initial layer is then cooled. In some examples, cooling can include an active process of removing thermal energy from the part or a layer of the part. In other examples, cooling can include a passive process of allowing a heated layer to radiatively dissipate heat to the local environment.

Controller 210 thereafter communicates with powder supply system 230 to supply and deposit another layer of combined powder on the cooled initial layer. The process is repeated to build up additional sintered and chemically cross-linked layers until fabrication of the three-dimensional part is substantially complete.

Controller 210 can be implemented in software, hardware, firmware or a combination thereof. When software is used, operations performed by controller 210 can be implemented in program code configured to run on hardware, such as a hardware processor unit. When firmware is used, the operations performed by controller 210 can be implemented in program code and data stored in persistent memory to run on a processor unit. When hardware is employed, the hardware can include circuits that operate to perform operations in controller 210.

In illustrative examples, hardware can take a form selected from at least one of a circuit system, an integrated circuit, an application specific integrated circuit (ASIC), a programmable logic device, or other suitable type of hardware configured to perform a number of operations. With a programmable logic device, the device can be configured to perform any number of operations. The device can be reconfigured at a later time, or can be permanently configured to perform any number of operations. Programmable logic devices include, for example, a programmable logic array, a programmable array logic, a field programmable logic array, a field programmable gate array (FPGA), or other suitable hardware devices. Additionally, processes can be implemented in organic components integrated with inorganic components, and can be comprised entirely of organic components excluding a human being. For example, processes can be implemented as circuits in organic semiconductors.

Figure 3:
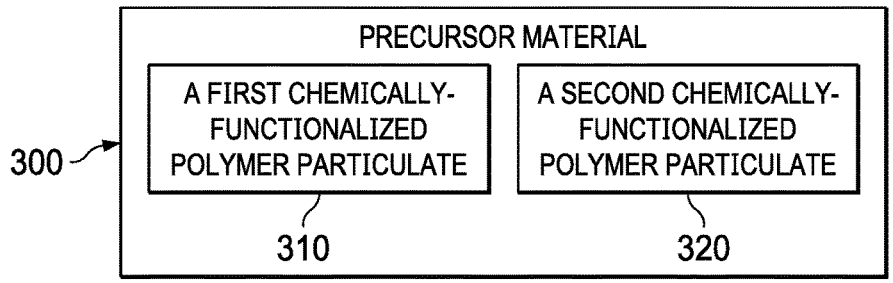
FIG. 3 is an illustration of a block diagram of a precursor material in accordance with an illustrative example.

Turning now to FIG. 3, an illustration of a block diagram of a precursor material is depicted in accordance with an illustrative example. In this Figure, precursor material 300 includes first chemically-functionalized polymer particulate 310 and second chemically-functionalized polymer particulate 320. In some illustrative examples, precursor material 300 can be combination 140 illustrated in FIG. 1, or combined powder 232 illustrated in FIG. 2.

In an illustrative example, first chemically-functionalized polymer particulate 310 can be produced or otherwise formed in accordance with any of the compositions, processes, devices, systems, or methods described above with respect to amine-functionalized particulate 132 as illustrated in FIG. 1, or first chemically-functionalized polymer powder 236 as illustrated in FIG. 2. Second chemically-functionalized polymer particulate 320 can be produced or otherwise formed in accordance with any of the compositions, processes, devices, systems, or methods described above with respect to epoxide-functionalized particulate 136 as illustrated in FIG. 1, or second chemically-functionalized polymer powder 234 as illustrated in FIG. 2.

Figure 4:
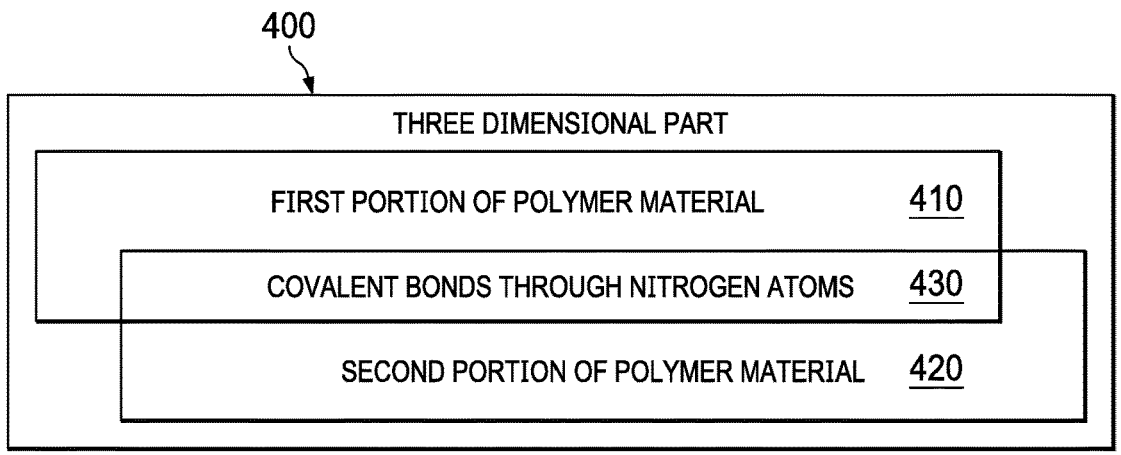
FIG. 4 is an illustration of a block diagram of a three-dimensional part in accordance with an illustrative example.

Turning now to FIG. 4, an illustration of a block diagram of a three-dimensional part is depicted in accordance with an illustrative example. Three-dimensional part 400 is an example of structure 160 in FIG. 1. Three-dimensional part 400 includes first portion of first polymer material 410 and second portion of second polymer material 420. In some implementations, three-dimensional part 400 can include a substantially fully formed part. In other implementations, three-dimensional part 400 can include a partially-formed part at any stage of additive manufacture. In illustrative examples, the portion can be an inter-layer portion, an intra-layer portion, a multi-layer portion, or a discontinuous portion. A discontinuous portion can be, for example, separate first regions of a first portion not in contact with each other, but otherwise in contact with corresponding separate second regions of a second portion.

In this illustrative example, first polymer material 410 and second polymer material 420 can include a same polymer material. First portion of first polymer material 410 and second portion of second polymer material 420 are respectively adhered to one another with covalent bonds. In an illustrative example, the covalent bonds are through nitrogen atoms 430—for example, as described above with reference to illustrative examples according to FIG. 1 or FIG. 2.

Figure 5:
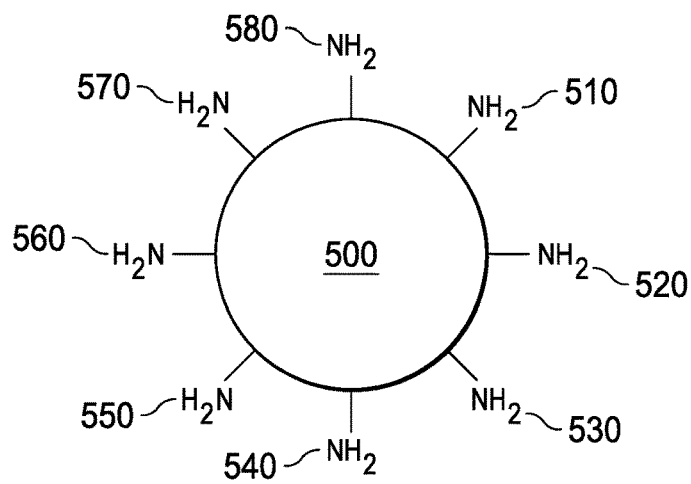
FIG. 5 is an illustration of a first plasma-treated particle in accordance with an illustrative example.

Turning now to FIG. 5, an illustration of a first plasma-treated particle is depicted in accordance with an illustrative example. As depicted, amine-functionalized particle 500 includes amine chemical moieties, such as amine chemical moiety 510, amine chemical moiety 520, amine chemical moiety 530, amine chemical moiety 540, amine chemical moiety 550, amine chemical moiety 560, amine chemical moiety 570, and amine chemical moiety 580—for example, as described above with reference to illustrative examples according to amine moieties 134 as depicted in FIG. 1, or first chemically-functionalized polymer powder 236 as depicted in FIG. 2.

Figure 6:
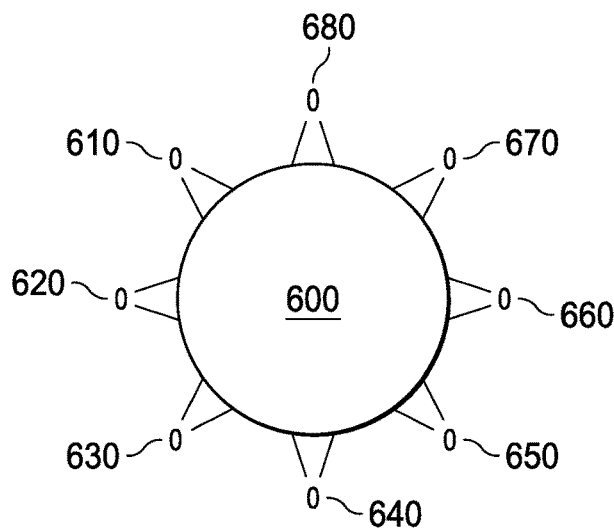
FIG. 6 is an illustration of a second plasma-treated particle in accordance with an illustrative example.

Turning now to FIG. 6, an illustration of a second plasma-treated particle is depicted in accordance with an illustrative example. As depicted, epoxide-functionalized particle 600 includes epoxide chemical moieties, such as epoxide chemical moiety 610, epoxide chemical moiety 620, epoxide chemical moiety 630, epoxide chemical moiety 640, epoxide chemical moiety 650, epoxide chemical moiety 660, epoxide chemical moiety 670, and epoxide chemical moiety 680—for example, as described above with reference to illustrative examples according to epoxide moieties 138 as depicted in FIG. 1, or second chemically-functionalized polymer powder 234 as depicted in FIG. 2.

Figure 7:
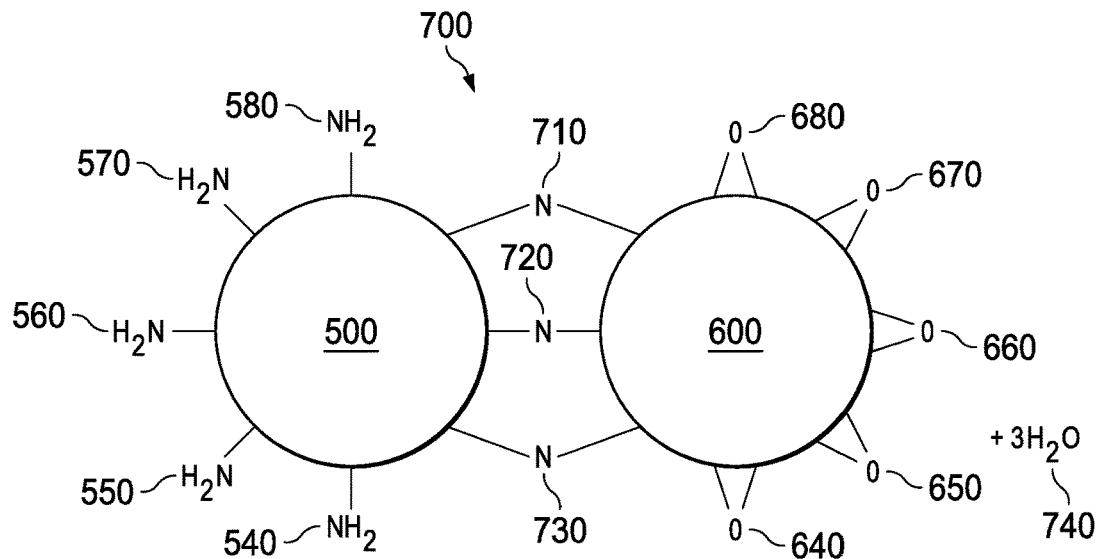
FIG. 7 is an illustration of a first plasma-treated particle covalently bonded to a second plasma-treated particle in accordance with an illustrative example.

Turning now to FIG. 7, an illustration of a first plasma-treated particle covalently bonded to a second plasma-treated particle is depicted in accordance with an illustrative example. As depicted, chemically bonded particles 700 include amine-functionalized particle 500 and epoxide-functionalized particle 600 adhered to one another with covalent bonds through nitrogen atoms 710, 720, and 730. It will be appreciated that a much greater number of amine-functionalized particles and epoxide-functionalized particles can be similarly covalently bonded between and among each other—for example, within a single layer deposition of an additive manufacturing sequence, or between adjacent depositions of immediately successive layers of an additive manufacturing sequence.

Heating of amine-functionalized particle 500 and epoxide-functionalized particle 600 achieves an activation energy associated with initiating chemical reactions between amine chemical moiety 510 and epoxide chemical moiety 610, between amine chemical moiety 520 and epoxide chemical moiety 620, and between amine chemical moiety 530 and epoxide chemical moiety 630. In order for cross-linking to occur, the temperature must be high enough to achieve an activation barrier associated with initiation of the chemical reaction. A covalent bond through nitrogen atom 710 is formed as a result of chemical reaction between amine chemical moiety 510 and epoxide chemical moiety 610—along with one molecule of water 740 as a byproduct. A covalent bond through nitrogen atom 720 is formed as a result of chemical reaction between amine chemical moiety 520 and epoxide chemical moiety 620—along with another molecule of water 740 as a byproduct. A covalent bond through nitrogen atom 730 is formed as a result of chemical reaction between amine chemical moiety 530 and epoxide chemical moiety 630—along with another molecule of water 740 as a byproduct. For example, chemical cross-linking reactions may proceed in accordance with the following general chemical reaction scheme:

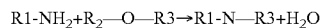

$$R1\text{-}NH_2 + R_2\text{—}O\text{—}R3 \rightarrow R1\text{-}N\text{—}R3 + H_2O$$

In an illustrative example, R1 is an atom of a first particle, and R2 and R3 are geminal atoms of a second particle that are bridged with an epoxide functional group. Attendant to chemical cross-linking, the epoxy group opens to form a covalent bond between R1 and R3 through nitrogen. After the chemical cross-linking reaction opens the cyclic ether ring of the epoxy group, R2 remains disposed on the surface of the second particle, and generally does not participate in covalent bonding between the first particle and the second particle.

The general cross-linking reaction occurs via a nucleophilic attack of the amine nitrogen on the terminal carbon of the epoxy group. The mechanism is generally believed to proceed as an SN2-type II, and thus the reaction rate obeys second-order kinetics. In such a mechanism, the hydrogen atom of the amine group does not react directly with the epoxy group, but rather the nucleophilic nitrogen atom attacks a carbon atom of the epoxy ring, and then the hydrogen atom from the amine eventually transfers to the epoxy oxygen atom to form —OH. The mechanism suggests that the reactivity depends on the nucleophilicity of the amine—which can vary substantially with electronic and steric effects of near field substituents.

Covalent bonds through nitrogen atoms 710, 720, and 730 generally correspond to some of covalent bonds through nitrogen atoms 430, as representatively illustrated in FIG. 4. Reference to this process as a "dehydration reaction," or contextual variants thereof, indicates that water 740 is produced as a byproduct of chemical reaction between amine chemical moieties 134 and epoxide chemical moieties 138 of FIG. 1.

Although methods, steps, operations, or procedures are presented in a specific order, this order may be changed in different examples. In some examples, to the extent multiple steps are shown as sequential in the specification, Figures, or claims, some combination of such operations in other examples may be performed at a same time or in a different order. The sequence of operations described herein may be interrupted, suspended, or otherwise controlled by another process.

Figure 8:
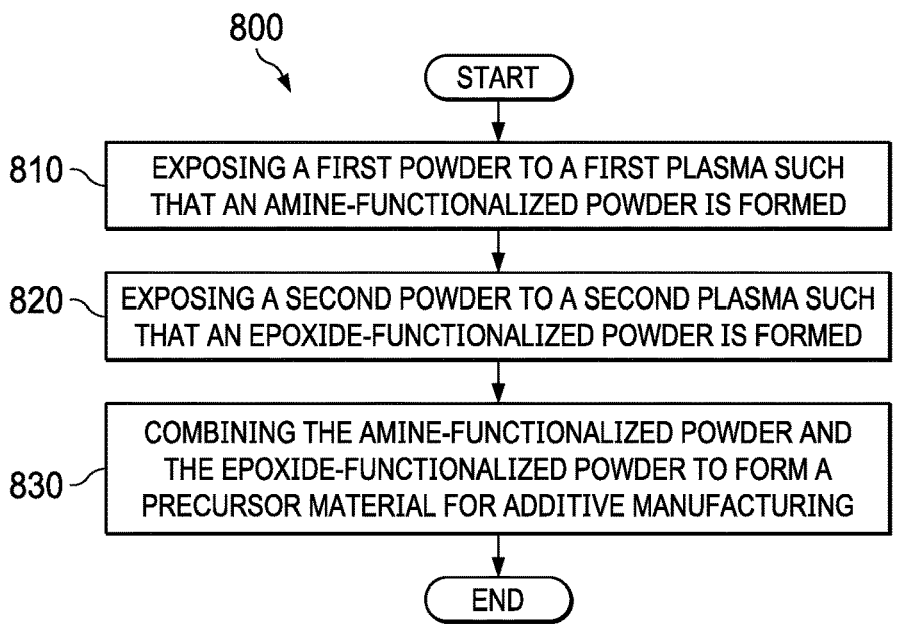
FIG. 8 is an illustration of a flowchart of a process for forming a precursor material in accordance with an illustrative example.

Turning now to FIG. 8, an illustration of a flowchart of a process for forming a precursor material is depicted in accordance with an illustrative example. The process illustrated in this flowchart can be implemented in additive manufacturing environment 100 to form combination 140 in FIG. 1, or can be implemented in additive manufacturing system 200 to form combined powder 232 in FIG. 2. In the example described herein, the combination is a powder.

In some implementations of illustrative examples described herein, one or more functions noted in the blocks can occur out of the order noted in the Figures. For example, in some cases, two blocks shown in succession may be performed substantially concurrently, or the blocks may sometimes be performed in reverse order, depending on functionality involved. Also, other blocks may be added in addition to the illustrated blocks in a flowchart or block diagram. In still other examples, one or more blocks may be optionally omitted.

Process 800 exposes a first powder to a first plasma (operation 810). In this operation, exposure is such that an amine-functionalized powder is formed. The first powder can include a polymer material suitably configured for use in a powder-based additive manufacturing process. For example, the first powder can include, nylon, flame-retardant nylon, mineral/glass-filled nylon, polystyrene, polyethylene, Polymethylmethacrylate (PMMA), thermoplastic elastomers, polyarylether ketones (PAEK), other polymer material, or the like. In representative implementations, selection of a suitable polymer material can be based on, for example, a desired flowability, viscosity, melting temperature, characteristic of a three-dimensional part so formed, or characteristic relating to stability under conditions for achieving an activation energy associated with forming covalent chemical bonds between particles.

The first plasma can include ammonia, or the first plasma can conjunctively or alternatively include molecular nitrogen, molecular hydrogen, or molecular nitrogen and molecular hydrogen. Exposure of the first powder to the first plasma produces an amine-functionalized powder. The amine-functionalized powder includes amine chemical moieties on exposed surfaces of the first powder. The amine chemical moieties can be —$NH_2$ chemical functional groups. The first powder can correspond to first particulate material 122, and the first plasma can correspond to first plasma 114 in FIG. 1. In an illustrative example, first particulate material 122 can be a plurality of amine-functionalized polymer particles. The amine-functionalized powder can be amine-functionalized particulate 132 of FIG. 1, first chemically-functionalized polymer powder 236 in FIG. 2, first chemically-functionalized polymer particulate 310 in FIG. 3, first portion of first polymer material 410 in FIG. 4, or amine-functionalized particle 500 in FIG. 5.

Process 800 exposes a second powder to a second plasma (operation 820). In this operation, exposure to the second plasma forms an epoxide-functionalized powder. The second powder can include a polymer material suitably configured for use in a powder-based additive manufacturing process. The polymer material of the second powder can be a same polymer material as that of the first powder. The second powder can include, nylon, flame-retardant nylon, mineral/glass-filled nylon, polystyrene, polyethylene, Polymethylmethacrylate (PMMA), thermoplastic elastomers, polyarylether ketones (PAEK), other polymer material, or the like. In representative implementations, selection of a suitable polymer material can be based on, for example, a desired flowability, viscosity, melting temperature, characteristic of a three-dimensional part so formed, or characteristic relating to stability under conditions for achieving an activation energy associated with forming covalent chemical bonds between particles.

In an illustrative example, second powder can be a same polymer powder as first powder. The second plasma can include oxygen, or the second plasma can conjunctively or alternatively include molecular oxygen or carbon dioxide. Exposure of the second powder to the second plasma produces an epoxide-functionalized powder. The epoxide-functionalized powder includes epoxide chemical moieties on exposed surfaces of the second powder. The epoxide chemical moieties can be —O— chemical functional groups. The second powder can correspond to second particulate material 124, and the second plasma can correspond to second plasma 118 in FIG. 1. In an illustrative example, second particulate material 124 can be a plurality of epoxide-functionalized polymer particles. The epoxide-functionalized powder can be epoxide-functionalized particulate 136 in FIG. 1, second chemically-functionalized polymer powder 234 in FIG. 2, second chemically-functionalized polymer particulate 320 in FIG. 3, second portion of second polymer material 420 in FIG. 4, or epoxide-functionalized particle 600 in FIG. 6.

Process 800 combines (operation 830) the amine-functionalized powder and the epoxide-functionalized powder to form a precursor material for additive manufacturing. The combination of the amine-functionalized powder and the epoxide-functionalized powder corresponds to combination 140 in FIG. 1, combined powder 232 in FIG. 2, or precursor material 300 in FIG. 3.

In illustrative examples, the combination of the amine-functionalized powder and the epoxide-functionalized powder can be a 1:1 mixture of amine-functionalized powder and epoxide-functionalized powder. In other illustrative examples, other ratios of amine-to-epoxide powder can be used. In an illustrative example, the amine-functionalized powder and the epoxide-functionalized powder are combined as a 1:1 mixture of amine-to-epoxide. In some examples, the mixture ratio is based on a stoichiometric ratio. That is to say, the mixture ratio can be based on a first number of moles of surface-borne amine groups:a second number of moles of surface-borne epoxide groups. In other examples, the mixture ratio is based on weight of amine-functionalized powder and epoxide-functionalized powder. That is to say, the mixture ratio can be based on a first weight of amine-functionalized powder:a second weight of epoxide-functionalized powder. In still other examples, the mixture ratio is based on volume of amine-functionalized powder to epoxide-functionalized powder. Other ratios of amine-to-epoxide powder are also possible, such that a desired amount or density of cross-linking is achieved. For example, illustrative amine-to-epoxide ratios can be greater than 1:1, or less than 1:1.

Figure 9:
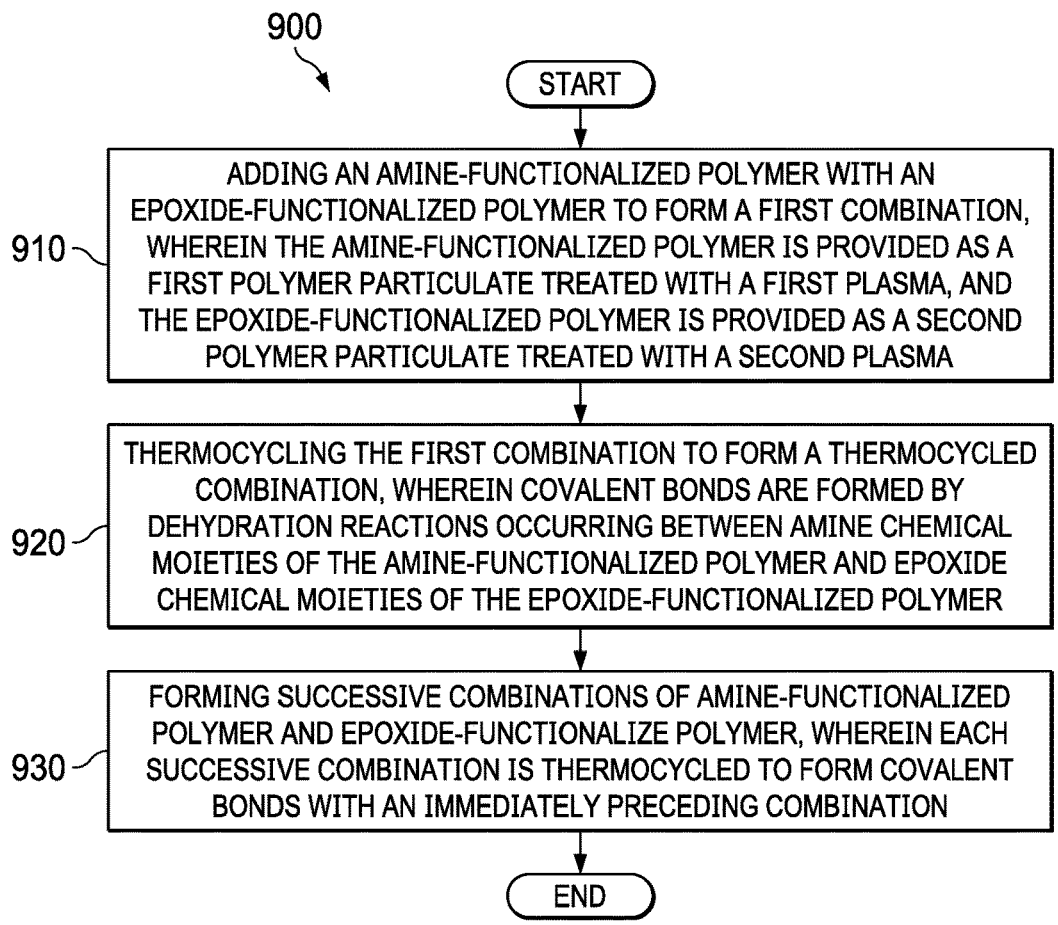
FIG. 9 is an illustration of a flowchart of a process for an additive manufacturing method in accordance with an illustrative example.

Turning now to FIG. 9, an illustration of a flowchart of a process for an additive manufacturing method is depicted in accordance with an illustrative example. The process illustrated in this flowchart can be implemented in additive manufacturing environment 100 to form structure 160 in FIG. 1, or can be implemented with additive manufacturing system 200 to form three-dimensional part 400 in FIG. 4.

Process 900 adds an amine-functionalized polymer with an epoxide-functionalized polymer to form a first combination (operation 910). In this operation, the amine-functionalized polymer is provided as a first polymer particulate treated with a first plasma, and the epoxide-functionalized polymer is provided as a second polymer particulate treated with a second plasma. The first polymer particulate can be a plurality of amine-functionalized polymer particles. The second polymer particulate can be a plurality of epoxide-functionalized polymer particles. The amine-functionalized polymer can be amine-functionalized particulate 132 of FIG. 1, first chemically-functionalized polymer powder 236 in FIG. 2, first chemically-functionalized polymer particulate 310 in FIG. 3, first portion of first polymer material 410 in FIG. 4, or amine-functionalized particle 500 in FIG. 5. The epoxide-functionalized polymer can be epoxide-functionalized particulate 136 in FIG. 1, second chemically-functionalized polymer powder 234 in FIG. 2, second chemically-functionalized polymer particulate 320 in FIG. 3, second portion of second polymer material 420 in FIG. 4, or epoxide-functionalized particle 600 in FIG. 6. The first combination can correspond to combination 140 in FIG. 1, combined powder 232 in FIG. 2, precursor material 300 in FIG. 3, or the precursor material referenced in process 800 in FIG. 8. The first polymer particulate can correspond to first particulate material 122 in FIG. 1, or the first powder referenced in process 800 in FIG. 8. The first plasma can correspond to first plasma 114 in FIG. 1, or the first plasma referenced in process 800 in FIG. 8. The second polymer particulate can correspond to second particulate material 124 in FIG. 1, or the second powder referenced in process 800 in FIG. 8. The second plasma can correspond to second plasma 118 in FIG. 1, or the second plasma referenced in process 800 in FIG. 8.

Process 900 thermocycles the first combination to form a thermocycled combination (operation 920). In this operation, covalent bonds are formed by dehydration reactions occurring between amine chemical moieties of the amine-functionalized polymer and epoxide chemical moieties of the epoxide-functionalized polymer. The thermocycled combination corresponds to heated combination 150 in FIG. 1. The covalent bonds can correspond to covalent bonds through nitrogen atoms 430 in FIG. 4, or covalent bonds through nitrogen atoms 710, 720, and 730 in FIG. 7. The amine chemical moieties can correspond to amine chemical moieties 510, 520, and 530 of FIG. 5. The epoxide chemical moieties can correspond to epoxide chemical moieties 610, 620, and 630 of FIG. 6.

Process 900 forms successive combinations of amine-functionalized polymer and epoxide-functionalized polymer (operation 930). In this operation, each successive combination is thermocycled to form successive covalent bonds with an immediately preceding combination. Each successive combination can include a mixture of additional aliquots of amine-functionalized polymer and additional aliquots of epoxide-functionalized polymer. The successive combinations can comprise any number of combination 140 in FIG. 1, heated combination 150 in FIG. 1, combined powder 232 in FIG. 2, precursor material 300 in FIG. 3, or the precursor material referenced in process 800.

In an illustrative example, the amine-functionalized polymer and the epoxide-functionalized polymer are combined as a 1:1 mixture of amine-to-epoxide. In some examples, the mixture ratio is based on a stoichiometric ratio. That is to say, the mixture ratio can be based on a first number of moles of surface-borne amine groups to a second number of moles of surface-borne epoxide groups. In other examples, the mixture ratio is based on weight of amine-functionalized polymer and epoxide-functionalized polymer. That is to say, the mixture ratio can be based on a first weight of amine-functionalized polymer to a second weight of epoxide-functionalized polymer. In still other examples, the mixture ratio is based on volume of amine-functionalized polymer to epoxide-functionalized polymer. Other ratios of amine-to-epoxide polymer are also possible. For example, illustrative amine-to-epoxide ratios can be greater than 1:1, or less than 1:1. In representative implementations, a ratio of amine-to-epoxide polymer can be selected such that a desired amount or density of chemical cross-linking is achieved.

Thermocycling can representatively correspond to exposure to heat, a heating cycle, or a heating and cooling cycle. In illustrative examples, thermocycling initiates formation of covalent bonds between amine-functionalized polymer and epoxide-functionalized polymer. Successive combinations can include successive covalent bonds between and among material forming each layer of each successive combination. A heating component of thermocycling can be configured to cause chemical dehydration reactions to occur—forming covalent bonds through nitrogen atoms, and also producing water as a byproduct. A cooling component of thermocycling can be configured to suitably prepare a partially fabricated part for another deposition of combined amine-functionalized polymer and epoxide-functionalized polymer in an additive build sequence. A cooling component of a final thermocycling step can be performed to conclude fabrication of the part.

Successive combinations of additional aliquots of amine-functionalized polymer and additional aliquots of epoxide-functionalized polymer are sequentially deposited and thermocycled on, over, or above preceding thermocycled combinations. The preceding thermocycled combinations can be regarded as preceding additive build layers in an additive manufacture sequence. Each of the successive combinations is thermocycled to form successive covalent bonds with an immediately preceding combination, or an immediately preceding build layer in the additive manufacture sequence.

In some illustrative examples, a first additive build layer includes a first layer of amine-functionalized polymer material and a second layer of epoxide-functionalized material. That is to say, a substantially homogeneous mixture of amine-functionalized polymer and epoxide-functionalized polymer need not be formed prior to thermocycling to produce covalent chemical bonds therebetween. For example, in one or more stages of a build sequence, a layer of epoxide-functionalized powder can be deposited on or over a layer of amine-functionalized powder, or a layer of amine-functionalized powder can be deposited on or over a layer of epoxide-functionalized powder, followed by thermocycling. In illustrative examples, layer-wise deposition of an amine-functionalized polymer layer on, over, or under an epoxide-functionalized polymer layer can be alternatively, conjunctively, or sequentially employed with deposition of combined amine/epoxide-functionalized powder in a different layer of the build sequence.

Figure 10:
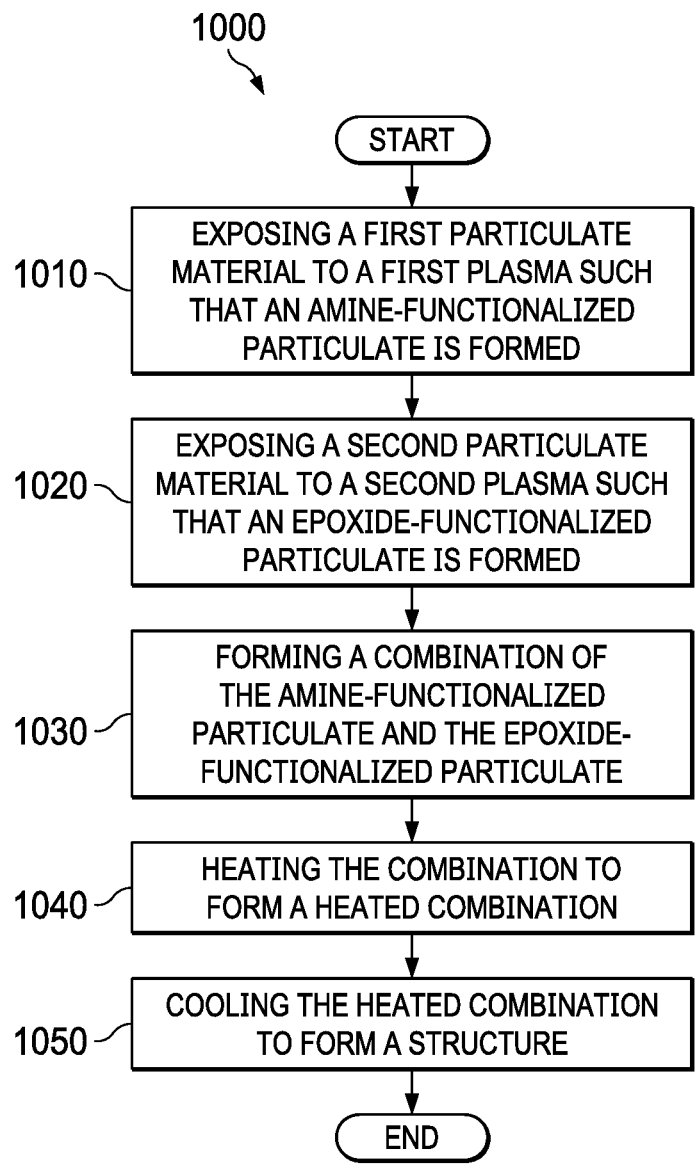
FIG. 10 is an illustration of a flowchart of a process for an additive manufacturing method in accordance with an illustrative example.

Turning now to FIG. 10, an illustration of a flowchart of a process is depicted in accordance with an illustrative example. The process illustrated in this flowchart can be implemented in additive manufacturing environment 100 to form structure 160 in FIG. 1, or can be implemented with additive manufacturing system 200 to form three-dimensional part 400 in FIG. 4. In some illustrative examples, the three-dimensional part can be a part or workpiece used in the manufacture or service of an aircraft.

Process 1000 exposes a first particulate material to a first plasma (operation 1010), such that an amine-functionalized particulate is formed, where the amine-functionalized particulate comprises amine chemical moieties. The first particulate material can include a polymer material suitably configured for use in an additive manufacturing process. For example, the first particulate material can include, nylon, flame-retardant nylon, mineral/glass-filled nylon, polystyrene, polyethylene, Polymethylmethacrylate (PMMA), thermoplastic elastomers, polyarylether ketones (PAEK), other polymer material, or the like. In representative implementations, selection of a suitable polymer material can be based on, for example, a desired flowability, viscosity, melting temperature, characteristic of a three-dimensional part so formed, or characteristic relating to stability under conditions for achieving an activation energy associated with forming covalent chemical bonds between particles.

The first plasma can include ammonia, or the first plasma can conjunctively or alternatively be generated with molecular nitrogen, molecular hydrogen, or molecular nitrogen and molecular hydrogen. Exposure of the first particulate material to the first plasma produces an amine-functionalized particulate material. The amine-functionalized particulate material includes amine chemical moieties on exposed surfaces of the first particulate material. The amine chemical moieties can be —$NH_2$ chemical functional groups. The first particulate material can correspond to first particulate material 122, and the first plasma can correspond to first plasma 114 in FIG. 1. The amine-functionalized particulate material can be amine-functionalized particulate 132 of FIG. 1, first chemically-functionalized polymer powder 236 in FIG. 2, first chemically-functionalized polymer particulate 310 in FIG. 3, first portion of first polymer material 410 in FIG. 4, or amine-functionalized particle 500 in FIG. 5.

Process 1000 exposes a second particulate material to a second plasma (operation 1020), such that an epoxide-functionalized particulate is formed, where the epoxide-functionalized particulate comprises epoxide chemical moieties. The second particulate material can include a polymer material suitably configured for use in an additive manufacturing process. The polymer material of the second particulate material can be a same polymer material as that of the first particulate material. The second particulate material can include, nylon, flame-retardant nylon, mineral/glass-filled nylon, polystyrene, polyethylene, Polymethylmethacrylate (PMMA), thermoplastic elastomers, polyarylether ketones (PAEK), other polymer material, or the like. In representative implementations, selection of a suitable polymer material can be based on, for example, a desired flowability, viscosity, melting temperature, characteristic of a three-dimensional part so formed, or characteristic relating to stability under conditions for achieving an activation energy associated with forming covalent chemical bonds between particles.

The second plasma can include oxygen, or the second plasma can conjunctively or alternatively be generated with molecular oxygen or carbon dioxide. Exposure of the second particulate material to the second plasma produces an epoxide-functionalized powder. The epoxide-functionalized powder includes epoxide chemical moieties on exposed surfaces of the second powder. The epoxide chemical moieties can be —O— chemical functional groups, where respective bonds of the —O— group are bonded to geminal atoms bonded to each other—thereby forming a three-membered cyclic ether. The second particulate material can correspond to second particulate material 124, and the second plasma can correspond to second plasma 118 in FIG. 1. The epoxide-functionalized powder can be epoxide-functionalized particulate 136 in FIG. 1, second chemically-functionalized polymer powder 234 in FIG. 2, second chemically-functionalized polymer particulate 320 in FIG. 3, second portion of second polymer material 420 in FIG. 4, or epoxide-functionalized particle 600 in FIG. 6.

Process 1000 forms a combination of the amine-functionalized particulate and the epoxide-functionalized particulate (operation 1030). The combination of the amine-functionalized particulate and the epoxide-functionalized particulate can correspond to combination 140 in FIG. 1, combined powder 232 in FIG. 2, or precursor material 300 in FIG. 3. In an illustrative example, the amine-functionalized particulate and the epoxide-functionalized particulate are combined as a 1:1 mixture of amine-to-epoxide. In some examples, the 1:1 mixture ratio is based on a stoichiometric ratio. That is to say, the 1:1 mixture ratio can be based on a first number of moles of surface-borne amine groups:a second number of moles of surface-borne epoxide groups. In other examples, the 1:1 mixture ratio is based on weight of amine-functionalized particulate and epoxide-functionalized particulate. That is to say, the 1:1 mixture ratio can be based on a first weight of amine-functionalized particulate: a second weight of epoxide-functionalized particulate. In still other examples, the 1:1 mixture ratio is based on volume of amine-functionalized particulate to epoxide-functionalized particulate. Other ratios of amine-to-epoxide particulate are also possible. For example, illustrative amine-to-epoxide ratios can be greater than 1:1, or less than 1:1 in order to achieve a desired amount or density of chemical cross-linking between amine-functionalized particulate and epoxide-functionalized particulate.

Process 1000 heats the combination to form a heated combination (operation 1040). Heating causes chemical reactions to occur—forming covalent bonds through nitrogen atoms, and also producing water as a byproduct. Exposure to heat causes chemical dehydration reactions to form covalent bonds between amine chemical moieties of the amine-functionalized particulate material and epoxide chemical moieties of the epoxide-functionalized particulate material. The heated combination corresponds to heated combination 150 in FIG. 1. The covalent bonds can correspond to covalent bonds through nitrogen atoms 430 in FIG. 4, or covalent bonds through nitrogen atoms 710, 720, and 730 in FIG. 7. The amine chemical moieties can correspond to amine chemical moieties 510, 520, and 530 of FIG. 5. The epoxide chemical moieties can correspond to epoxide chemical moieties 610, 620, and 630 of FIG. 6.

Process 1000 cools the heated combination to form a structure (operation 1050). In some examples, cooling can include a process of actively removing thermal energy from a layer of the structure, for example, with convective cooling. In other examples, cooling can include a passive process of allowing a heated layer to passively dissipate heat to the local environment. The structure can correspond to structure 160 in FIG. 1, or three-dimensional part 400 in FIG. 4. In some illustrative examples, the three-dimensional part can be a part or workpiece used in the manufacture or service of an aircraft.

Figure 11:
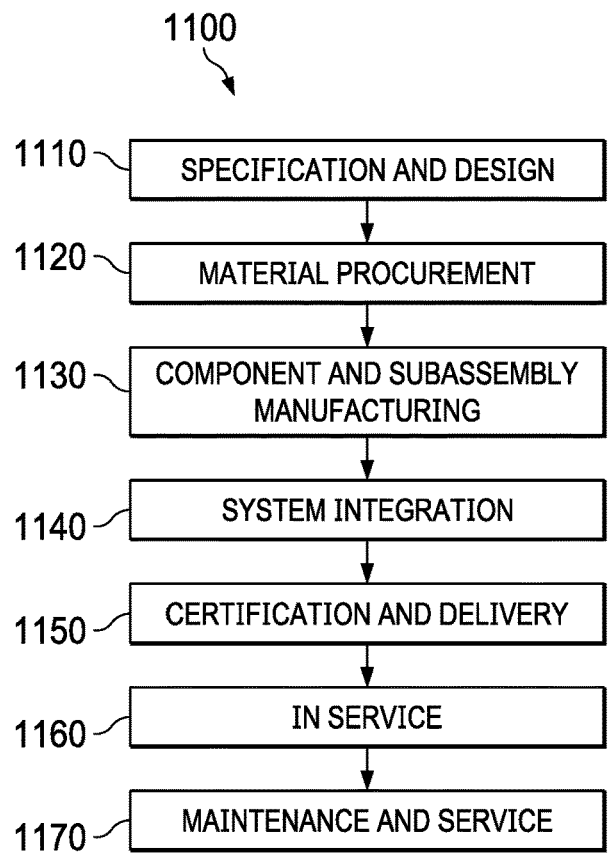
FIG. 11 is an illustration of an aircraft manufacturing and servicing method in accordance with an illustrative example.
Figure 12:
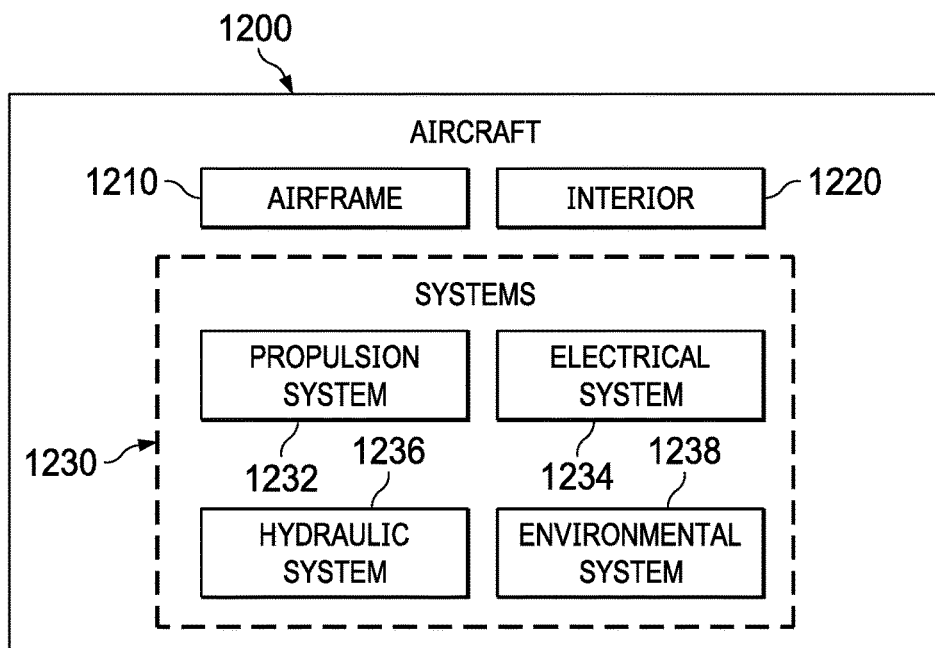
FIG. 12 is an illustration of a block diagram of an aircraft in which an illustrative example can be implemented.

Turning now to FIG. 11, an illustration of an aircraft manufacturing and servicing method is depicted in accordance with an illustrative example. In FIG. 12, an illustration of a block diagram of an aircraft in which an illustrative example can be implemented is depicted. Illustrative examples of the disclosure may be described in the context of aircraft manufacturing and servicing method 1100 as shown in FIG. 11 and aircraft 1200 as shown in FIG. 12. Turning first to FIG. 11, an illustration of an aircraft manufacturing and servicing method is depicted in accordance with an illustrative example. During pre-production, aircraft manufacturing and servicing method 1100 can include specification and design 1110 of aircraft 1200 in FIG. 12 and material procurement 1120.

During production, component and subassembly manufacturing 1130 and system integration 1140 of aircraft 1200 in FIG. 12 takes place. Thereafter, aircraft 1200 in FIG. 12 can go through certification and delivery 1150 in order to be placed in service 1160. While in service 1160 by a customer, aircraft 1200 in FIG. 12 is scheduled for routine maintenance and service 1170, which can include modification, reconfiguration, refurbishment, or other maintenance or service.

Each of the processes of aircraft manufacturing and servicing method 1100 can be performed or carried out by a system integrator, a third party, an operator, or some combination thereof. In these examples, the operator can be a customer. For purposes of this description, a system integrator can include, without limitation, any number of aircraft manufacturers and major-system subcontractors. A third party can include, without limitation, any number of vendors, subcontractors, and suppliers. An operator can be an airline, a leasing company, a military entity, a service organization, or the like.

With reference now to FIG. 12, an illustration of an aircraft 1200 is depicted in which an illustrative example can be implemented. In this example, aircraft 1200 is produced by aircraft manufacturing and servicing method 1100 in FIG. 11, and can include airframe 1210 with plurality of systems 1230 and interior 1220. Examples of systems 1230 include one or more of propulsion system 1232, electrical system 1234, hydraulic system 1236, or environmental system 1238. Any number of other systems can be included. Although an aerospace example is shown, different illustrative examples can be applied to other industries, such as automotive industries, nautical industries, or the like. In the illustrative example, one or more components of aircraft 1200 can be manufactured using combination 140 in FIG. 1. For example, combination 140 can be used to form various components such as a stringer, a skin panel, or other components in airframe 1210. As another example, combination 140 in FIG. 1 can be used to form ducts, ductwork, molding, or other components within interior 1220 of aircraft 1200. These components can have improved strength because of chemical covalent bonds that are present in parts generated using combination 140.

Apparatuses and methods representatively described herein can be employed during at least one stage of aircraft manufacturing and servicing method 1100 in FIG. 11. In an illustrative example, components or subassemblies produced in component and subassembly manufacturing 1130 in FIG. 11 can be fabricated or manufactured in a manner similar to components or subassemblies produced while aircraft 1200 is in service 1160 in FIG. 11. As yet another example, one or more apparatus examples, method examples, or a combination thereof can be utilized during production stages, such as component and subassembly manufacturing 1130 or system integration 1140 in FIG. 11. One or more apparatus examples, method examples, or a combination thereof can be utilized while aircraft 1200 is in service 1160, during maintenance and service 1170 in FIG. 11, or both. The use of a number of the different illustrative examples can substantially expedite assembly of aircraft 1200, reduce the cost of aircraft 1200, or both expedite assembly of aircraft 1200 and reduce the cost of aircraft 1200. For example, expedited assembly of aircraft 1200 can be accomplished with rapid prototyping using selective laser sintering additive manufacturing techniques that employ apparatuses and methods representatively described herein—as compared to injection molding that would otherwise provide similar part strength. By way of further example, reduced cost of aircraft 1200 can be accomplished using selective laser sintering additive manufacturing techniques that employ apparatuses and methods representatively described herein—as compared to injection molding that would otherwise involve fabrication of molds.

Examples or illustrations provided herein are not to be regarded in any way as restrictions on, limits to, or express definitions of any term or terms with which they are associated. Instead, the examples or illustrations are to be regarded as being described with respect to a particular example and as merely illustrative. Those skilled in the art will appreciate that any term or terms with which these examples or illustrations are associated will encompass other examples that may or may not be given therewith or elsewhere in the specification, and all such examples are intended to be included within the scope of that term or those terms. Language designating such non-limiting examples and illustrations includes, but is not limited to: "for example," "for instance," "in an example," "in one example," or the like. Reference throughout this specification to "one example," "an example," "an illustrative example," "a particular example," or "a specific example," or contextually similar terminology, means that a particular feature, structure, property, or characteristic described in connection with the example is included in at least one example and may not necessarily be present in all examples. Thus, respective appearances of the phrases "in an example," "in an illustrative example," or "in a specific example," or similar terminology in various places throughout the specification are not necessarily referring to the same example. Use of the term "example," or contextual variants thereof, in no way indicates admission of prior art. Furthermore, particular features, structures, properties, or characteristics of any specific example may be combined in any suitable manner with one or more other examples. In illustrative examples, uniform hatching, or absence of hatching, illustrated in the Figures may correspond to a substantially homogenous material. In other illustrative examples, unitary hatching, or absence of hatching, may represent one or more component material layers.

A general aspect of the present disclosure includes an illustrative method for additive manufacturing. The method includes exposing a first particulate material to a first plasma, such that an amine-functionalized particulate is formed, where the amine-functionalized particulate includes amine chemical moieties. The method also includes exposing a second particulate material to a second plasma, such that an epoxide-functionalized particulate is formed, where the epoxide-functionalized particulate includes epoxide chemical moieties. The method also includes forming a combination of the amine-functionalized particulate and the epoxide-functionalized particulate. The method also includes heating the combination to form a heated combination. The method further includes cooling the heated combination to form a structure. The combination can be heated such that covalent bonds are formed between amine-functionalized particulate and epoxide-functionalized particulate in the heated combination. Heating the combination can be suitably configured or otherwise adapted to cause dehydration reactions to occur between amine chemical moieties and epoxide chemical moieties. The first plasma can include at least one of: ammonia; molecular nitrogen; or molecular nitrogen and molecular hydrogen. The second plasma can include oxygen. The second plasma can include at least one of molecular oxygen or carbon dioxide. The first particulate material can be a first plurality of first polymer particles. The second particulate material can be a second plurality of second polymer particles. The amine-functionalized particulate can be a plurality of amine-functionalized polymer particles. The epoxide-functionalized particulate can be a plurality of epoxide-functionalized polymer particles. The combination can be uniformly mixed in a pre-determined ratio of amine-functionalized polymer particles and epoxide-functionalized polymer particles. The first plurality of first polymer particles can be a first polymer powder, and the second plurality of second polymer particles can be a second polymer powder. The second polymer powder can include a same polymer material as the first polymer powder. The heating can be associated with an additive manufacturing process—for example, a selective laser sintering process. Implementations of described techniques can include systems, hardware, or apparatuses for performing various method or process steps.

Another general aspect of the present disclosure includes another illustrative method for additive manufacturing. The method includes adding an amine-functionalized polymer with an epoxide-functionalized polymer to form a first combination, where the amine-functionalized polymer is provided as a first polymer particulate treated with a first plasma, and the epoxide-functionalized polymer is provided as a second polymer particulate treated with a second plasma. The method also includes thermocycling the first combination to form a thermocycled combination, where covalent bonds are formed by dehydration reactions occurring between amine chemical moieties of the amine-functionalized polymer and epoxide chemical moieties of the epoxide-functionalized polymer. The method also includes forming successive combinations of amine-functionalized polymer and epoxide-functionalized polymer over the thermocycled combination, where each successive combination is thermocycled to form successive covalent bonds with an immediately preceding combination—for example, an immediately preceding material layer. The first plasma can be generated with ammonia. The first plasma can conjunctively or alternatively be generated with molecular nitrogen, molecular hydrogen, or molecular nitrogen and molecular hydrogen. The second plasma can be generated with oxygen. The second plasma can conjunctively or alternatively be generated with molecular oxygen or carbon dioxide. The first polymer can be a first plurality of particles. The second polymer can be a second plurality of particles. The amine-functionalized polymer can be a plurality of amine-functionalized particles. The epoxide-functionalized polymer can be a plurality of epoxide-functionalized particles. Each successive combination can include a mixture of additional aliquots of amine-functionalized particles and epoxide-functionalized particles. The first combination and each successive combination can include a uniformly mixed, pre-determined ratio of amine-functionalized particles and epoxide-functionalized particles. The first plurality of particles can be a first polymer powder, and the second plurality of particles can be a second polymer powder. The second polymer powder can include a same polymer material as the first polymer powder. The thermocycling can include a selective laser sintering process—for example, as used in an additive manufacturing process. Implementations of described techniques may include systems, hardware, or apparatuses for performing various method or process steps.

Another general aspect includes a representative method for forming precursor material that can be used in an additive manufacturing process. The representative method includes a step of exposing a first powder to a first plasma such that an amine-functionalized powder is formed. The representative method also includes a step of exposing a second powder to a second plasma such that an epoxide-functionalized powder is formed. The representative method further includes a step of combining the amine-functionalized powder and the epoxide-functionalized powder to form a precursor material for additive manufacturing. The first plasma can conjunctively or alternatively include molecular nitrogen, molecular hydrogen, or molecular nitrogen and molecular hydrogen. The second plasma can include oxygen. The second plasma can conjunctively or alternatively include molecular oxygen or carbon dioxide. The precursor material can include a pre-determined ratio of amine-functionalized powder and epoxide-functionalized powder. The amine-functionalized powder can include a same polymer material as the epoxide-functionalized powder. Implementations of the described techniques may include systems, hardware, and apparatuses for performing various method or process steps.

Another general aspect includes a representative additive manufacturing system that includes a laser system. The representative additive manufacturing system also includes a powder supply system that supplies a combined powder comprising a first chemically-functionalized polymer powder and a second chemically-functionalized polymer powder different than the first chemically-functionalized polymer powder. The combined powder is configured or otherwise suitably adapted for covalent bonds to be formed between the first chemically-functionalized polymer powder and the second chemically-functionalized polymer powder upon exposure to heat. The representative additive manufacturing system also includes a build platform, and a controller. The controller is in communication with the laser system, and is also in communication with the powder supply system. The controller operates and is configured to control the powder supply system to deposit the combined powder onto the build platform. The laser system is configured to apply heat to the combined powder on the build platform. The first chemically-functionalized polymer powder can include a first powder treated with a first plasma. The first plasma can include ammonia. The first plasma can conjunctively or alternatively include molecular nitrogen, molecular hydrogen, or molecular nitrogen and molecular hydrogen. The second chemically-functionalized polymer powder can include a second powder treated with a second plasma. The second plasma can include oxygen. The second plasma can conjunctively or alternatively include molecular oxygen or carbon dioxide. The first powder and the second powder can be a same polymer powder. The same polymer powder can include at least one of nylon, polystyrene, polyethylene, polymethylmethacrylate (PMMA), thermoplastic elastomers, or polyarylether ketones (PAEK). The combined powder can include a pre-determined ratio of the first chemically-functionalized polymer powder and the second chemically-functionalized polymer powder. The first chemically-functionalized polymer powder can include a polymer material, and the second chemically-functionalized polymer powder can include the same polymer material. Implementations of the described techniques may include corresponding devices, hardware, and methods, each configured to operate and utilize the additive manufacturing system.

Yet another general aspect includes a representative precursor material for additive manufacturing. The representative precursor material includes a first chemically-functionalized polymer particulate, and a second chemically-functionalized polymer particulate different than the first chemically-functionalized polymer particulate. The representative precursor material is configured or otherwise suitably adapted for covalent bonds to be formed between the first chemically-functionalized polymer particulate and the second chemically-functionalized polymer particulate upon exposure to heat. Other representative examples include corresponding systems, apparatuses, and methods, each configured to utilize the precursor material in an additive manufacturing process. The first chemically-functionalized polymer particulate can be an amine-functionalized polymer particulate, and the second chemically-functionalized polymer particulate can be an epoxide-functionalized polymer particulate. The precursor material can be configured for covalent bonds to be formed by dehydration reactions occurring between amine chemical moieties of the amine-functionalized polymer particulate and epoxide chemical moieties of the epoxide-functionalized polymer particulate. The amine-functionalized polymer particulate can be a first plurality of polymer particles, and the epoxide-functionalized polymer particulate can be a second plurality of polymer particles. The first plurality of polymer particles and the second plurality of polymer particles can include a pre-determined ratio of the amine-functionalized polymer particulate and the epoxide-functionalized polymer particulate. The first plurality of polymer particles and the second plurality of polymer particles can include a same polymer material. The same polymer material can be at least one of nylon, polystyrene, polyethylene, polymethylmethacrylate (PMMA), thermoplastic elastomers, or polyarylether ketones (PAEK). Implementations of the described techniques may include systems, apparatuses, or methods, each configured to utilize the precursor material in an additive manufacturing process.

Still another general aspect includes a representative three-dimensional part formed with an additive manufacturing process. The representative three-dimensional part includes a first portion of a polymer material, and a second portion of the polymer material. The second portion is covalently bonded through a plurality of nitrogen atoms to the first portion. The polymer material can include at least one of nylon, polystyrene, polyethylene, polymethylmethacrylate (PMMA), thermoplastic elastomers, or polyarylether ketones (PAEK). Other examples of this representative aspect include corresponding systems, apparatuses, and methods, each configured to utilize an additive manufacturing process to produce the three-dimensional part.

One or more technical solutions are presented that overcome technical problems associated with providing improved intra-layer or inter-layer adhesion in additively manufactured parts. Additionally, one or more technical solutions described herein provide technical effects of: enabling formation of chemical bonds between constituent materials used in additive manufacturing processes; enabling fabrication of additively manufactured parts that are at least as strong as parts fabricated with injection molding techniques; enabling increased utilization of additive manufacturing for making strong parts—for example, in rapid prototyping contexts; supporting part qualification with respect to manufacturing specifications or mechanical property requirements; and realizing cost savings associated with using additive manufacturing to make parts that are at least as strong as parts fabricated with other processes.

Descriptions of different illustrative examples has been presented for purposes of illustration and description, and are not intended to be exhaustive or limited to the examples in the form disclosed. The different illustrative examples describe components that perform actions or operations. In an illustrative example, a component can be configured to perform action or operation described. For example, a component can have a configuration or design for a structure that provides the component an ability to perform the action or operation that is described in the illustrative examples as being performed by the component.

Many modifications and variations will be apparent to those of ordinary skill in the art. Furthermore, different illustrative examples may provide different features as compared to other examples. The examples or examples selected are chosen and described in order to explain principles of the examples, practical application, and to enable others of ordinary skill in the art to understand the disclosure for various examples with various modifications as are suited to one or more particular contemplated uses.

What is claimed is:
1. A method of additive manufacturing, the method comprising:
  exposing a first particulate material to a first plasma such that an amine-functionalized particulate is formed, wherein the amine-functionalized particulate comprises amine chemical moieties;
  exposing a second particulate material to a second plasma such that an epoxide-functionalized particulate is formed, wherein the epoxide-functionalized particulate comprises epoxide chemical moieties;
  combining the amine-functionalized particulate and the epoxide-functionalized particulate;
  heating the combination to form a heated combination; and
  cooling the heated combination to form a structure,
  wherein heating comprises selective laser sintering of a discontinuous intra-layer portion comprising separate first regions of a first portion not in contact with each other, but otherwise in contact with corresponding separate second regions of a second portion.

2. The method of claim 1, wherein the heating comprises:
forming by chemical reaction cross-linking covalent bonds between the amine-functionalized particulate and the epoxide-functionalized particulate in the heated combination.

3. The method of claim 2, wherein the heating causes dehydration reactions to occur between the amine chemical moieties and the epoxide chemical moieties.

4. The method of claim 3, wherein:
the first plasma comprises at least one of:
ammonia;
molecular nitrogen; or
molecular nitrogen and molecular hydrogen; and
the second plasma comprises at least one of:
molecular oxygen; or
carbon dioxide.

5. The method of claim 4, wherein:
the first particulate material is a first plurality of first polymer particles;
the second particulate material is a second plurality of second polymer particles;
the amine-functionalized particulate is a plurality of amine-functionalized polymer particles; and
the epoxide-functionalized particulate is a plurality of epoxide-functionalized polymer particles.

6. The method of claim 5, wherein the combining uniformly mixes a pre-determined ratio of the amine-functionalized polymer particles and the epoxide-functionalized polymer particles.

7. The method of claim 6, wherein the first plurality of first polymer particles is a first polymer powder, and the second plurality of second polymer particles is a second polymer powder.

8. The method of claim 4, wherein the heating further comprises a sub-surface deposition of heat at a focused depth along a predetermined path.

9. The method of claim 1, wherein the heating comprises sub-surface deposition of heat at a focused depth along a predetermined path.

10. A method for additive manufacturing, the method comprising:
adding an amine-functionalized polymer with an epoxide-functionalized polymer to form a first combination, wherein the amine-functionalized polymer is provided as a first polymer particulate treated with a first plasma, and the epoxide-functionalized polymer is provided as a second polymer particulate treated with a second plasma;
thermocycling the first combination to form a thermocycled combination, wherein covalent bonds are formed by dehydration reactions occurring between amine chemical moieties of the amine-functionalized polymer and epoxide chemical moieties of the epoxide-functionalized polymer; and
forming successive combinations of the amine-functionalized polymer and the epoxide-functionalized polymer over the thermocycled combination, wherein each of the successive combinations is thermocycled to form successive covalent bonds with an immediately preceding combination,
wherein the thermocycling comprises selective laser sintering of a discontinuous intra-layer portion comprising separate first regions of a first portion not in contact with each other, but otherwise in contact with corresponding separate second regions of a second portion.

11. The method of claim 10, wherein:
the first plasma is generated with at least one of:
ammonia;
molecular nitrogen; or
molecular nitrogen and molecular hydrogen; and
the second plasma is generated with at least one of:
molecular oxygen; or
carbon dioxide.

12. The method of claim 10, wherein the first polymer particulate is a first plurality of first particles, the second polymer particulate is a second plurality of second particles, the amine-functionalized polymer is a plurality of amine-functionalized particles, the epoxide-functionalized polymer is a plurality of epoxide-functionalized particles, and each of the successive combinations comprises a mixture of additional aliquots of the amine-functionalized particles and the epoxide-functionalized particles.

13. The method of claim 12, wherein the first combination and each of the successive combinations comprises a uniformly mixed, pre-determined ratio of the amine-functionalized particles and the epoxide-functionalized particles.

14. The method of claim 13, wherein the first plurality of first particles is a first polymer powder, and the second plurality of second particles is a second polymer powder.

15. The method of claim 14, wherein the second polymer powder comprises a same polymer material as the first polymer powder.

16. The method of claim 10, wherein the thermocycling comprises a sub-surface deposition of heat at a focused depth along a predetermined path.

17. A method for forming precursor material for additive manufacturing, the method comprising:
exposing a first powder to a first plasma such that an amine-functionalized powder is formed;
exposing a second powder to a second plasma such that an epoxide-functionalized powder is formed;
combining the amine-functionalized powder and the epoxide-functionalized powder to form the precursor material; and
preparing the precursor material for thermocycling,
wherein the thermocycling comprises selective laser sintering of a discontinuous intra-layer portion comprising separate first regions of a first portion not in contact with each other, but otherwise in contact with corresponding separate second regions of a second portion.

18. The method of claim 17, wherein:
the first plasma comprises at least one of:
ammonia;
molecular nitrogen; or
molecular nitrogen and molecular hydrogen; and
the second plasma comprises at least one of:
molecular oxygen; or
carbon dioxide.

19. The method of claim 17, wherein the precursor material comprises a pre-determined ratio of the amine-functionalized powder and the epoxide-functionalized powder.

20. The method of claim 17, wherein the amine-functionalized powder comprises a same polymer material as the epoxide-functionalized powder.

* * * * *